United States Patent Office 3,786,030
Patented Jan. 15, 1974

3,786,030
CATALYST FOR TRIMERIZING POLYISOCYANATES
David E. Rice, Woodbury, Minn., assignor to Minnesota Mining and Manufacturing Company, St. Paul, Minn.
No Drawing. Filed Apr. 5, 1972, Ser. No. 241,413
Int. Cl. C08g 22/00
U.S. Cl. 260—77.5 NC          8 Claims

ABSTRACT OF THE DISCLOSURE

Certain dialkylaminoalkylurethanes, formed by the reaction of isocyanates with certain N,N-dialkylalkanolamines, are used as latent catalysts for the cross-linking or trimerization of polyisocyanate-terminated prepolymers.

---

This invention relates to a process for trimerizing isocyanate-terminated urethane prepolymers to produce cross-linked poly(isocyanurate-urethanes). In a further aspect, it relates to catalysts useful in trimerizing isocyanate-terminated urethane prepolymers and to a method of making said catalysts.

The trimerization of aliphatic or aromatic isocyanates to produce isocyanurates is well known. A host of trimerization catalysts have been disclosed, used, or patented (see, Polyurethane: Chemistry and Technology, Part I, by J. H. Saunders and K. C. Frisch, Interscience Pub., New York (1962), p. 94 and U.S. Pat. Nos. 2,979,485, 2,954,365, 2,978,449 and 3,211,703). The trimerization of isocyanates is particularly of interest in urethane polymer chemistry to produce poly(isocyanurate-urethane). The isocyanurate moieties in the poly(isocyanurate-urethane) impart temperature stability and hydrolytic stability and the urethane moieties impart toughness and shock resistance to the cured resin.

Though many of the catalysts disclosed in the above-described prior art processes have merit, they also have undesirable features. For example, prior art tertiary amine catalysts are active at room temperature and higher temperatures. However, in some applications involving trimerization to form cross-linked polyisocyanurate polymers, it is desirable that the curing reaction take place rapidly at elevated temperatures but proceed very slowly at room temperature in order to provide systems with extended pot life at ambient room temperatures. In some cases, a resin system which cures very quickly at room temperature creates processing problems when used and restricts the amount of resin which can be mixed at one time. Where the resins cure rapidly at an elevated temperature, however, processing is simplified and a fully-cured poly(isocyanurate-urethane) can be quickly produced.

Co-catalyst systems composed of a urethane compound and a separate tertiary amine compound for preparation of polyisocyanurates have been disclosed (see U.S. Pat. No. 2,954,365). These co-catalyst systems may use, as a catalyst component, urethanes consisting of one mol of N,N-dialkylaminoethanol and one mol of phenyl isocyanate, or one mol of N-alkyldiethanolamine and two moles of phenyl isocyanate; however, these systems have poor room temperature latency and in some cases the reaction mixture must be diluted or cooled to control the trimerization of isocyanate at ambient temperatures. Generally, those prior art systems which do not cure rapidly at room temperature also do not provide for a markedly accelerated cure at elevated temperatures.

Briefly, it has been discovered that dialkylaminoalkyl-urethanes are latent catalysts at room temperature but active catalysts at elevated temperatures for the trimerization of isocyanate-terminated urethane prepolymers. Said catalysts can be prepared by reacting certain dialkyl-alkanolamines with isocyanate-terminated urethane prepolymers.

The isocyanate-terminated prepolymers used to form the catalysts of this invention are known (see, U.S. Pat. No. 3,054,755) and are generally prepared by reacting an excess of polyisocyanate, such as an aromatic diisocyanate, with polyalkyleneether polyols or polyester polyols. Broadly, said NCO-terminated prepolymers have the structure:

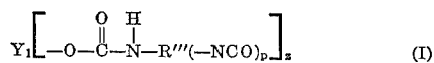   (I)

where $Y_1$ is the hydroxyl-free residue of a polyol having a plurality of hydroxyl groups, $R'''$ is the residue of a polyisocyanate precursor used to make the isocyanate-terminated prepolymer, $p$ is equal to $q-1$ where $q$ is the number of isocyanate moieties of said polyisocyanate, and $z$ is the number equal to the functionality or hydroxyl groups of said polyol. Generally, $p$ will be an integer from 1 to 4, preferably 1 to 2, and $z$ will be an integer from 2 to 6, preferably 2 to 4.

The polyol component used in making said prepolymers is preferably a low molecular weight polyoxyalkylene polyol, but may also be a low molecular weight non-polymeric polyol, polyester, or polyetheramide containing reactive hydroxyl groups. Polyols having a molecular weight up to about 5000 are useful. A polyol with a hydroxyl equivalent weight between about 130 and 1000 (i.e., one active OH group per 130 to 1000 molecular weight of polyol) is preferred.

Examples of the preferred polyoxyalkylene polyols useful in forming the isocyanate prepolymer are polyoxyethylene polyols, polyoxypropylene polyols, or polyoxybutylene polyols, such as the glycols represented by the formula: $HO(RO)_nH$, where $(RO)_n$ is polyoxyalkylene, for example, polyoxypropylene. Other useful polyoxyalkylene polyols are the condensates of ethylene, propylene or butylene oxides with pentaerythritol, sorbitol, sucrose, methylglycosides, or low molecular weight polyols, such as propylene glycol, tri-, tetra-, penta-, hexamethylene glycols, 1,3-butylene glycol, 1,3-(2-ethyl)hexanediol, 2,2,4-trimethyl-1,3-pentanediol, trimethylolpropane, or 1,2,6-hexanetriol. The low molecular weight polyols mentioned above can also be used and preferably blended with polymeric polyols as components in the reaction mixture. Useful polyester polyols include castor oil, derivatives thereof, and those generally prepared by the esterification reaction of an organic dicarboxylic acid or anhydride thereof with an alkylene oxide polyol such as propylene or butylene oxide polyols. The acid or anhydride may be selected from a wide variety of polybasic acids, such as malonic or succinic acids or prepared by dimerization or trimerization of unsaturated fatty acids with 18 carbon atoms. The reactants are combined at molecular ratios to provide hydroxyl-terminated groups on the polyester molecules.

The dialkylaminoalkylurethane catalysts of this invention can be prepared by reacting precursor N,N-dialkyl-alkanolamines with isocyanate-terminated urethane prepolymers. The N,N-dialkylalkanolamines useful as precursors in the preparation of such catalysts have the structure:

   (II)

where R is lower alkyl having 1–6, preferably 1–4, carbon atoms and R′ is lower alkylene having 2–5, preferably 2–3, carbon atoms. The preferred N,N-dialkylalkanol-amines are N,N-dimethyl or diethyl ethanolamines or the N,N-dimethyl or diethyl propanolamines. When a larger alkyl group is substituted on the nitrogen atom or if higher homologous alkanols are used, the catalyst efficiency at elevated temperatures decreases and the period of room temperature latency gradually shortens as the length of the alkyl or alkylene moieties increases. Also, the higher homologous alcohols provide a catalyst of reduced activity which results in cured isocyanurate resins having substantially less cross-linking than those resulting from the use of the catalysts derived from the preferred dialkylalkanolamines. The hydroxyl group of the dialkanolamines of Formula II reacts with an isocyanate group of the isocyanate-terminated prepolymers of Formula I to form a urethane linkage, thus providing dialkylaminoalkylurethanes having a formula:

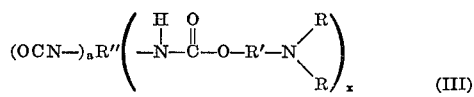
(III)

where R'' is the isocyanate-free residue of the isocyanate-terminated prepolymer of Formula I, $x$ is an integer equal to the number of isocyanate moieties of said prepolymer which reacted with the hydroxyl group of the alkanolamine of Formula II to form urethane linkages, $x$ being at least one, and $a$ is the number of unreacted or remaining isocyanate moieties in said prepolymer. The sum of $a$ plus $x$ is equal to the product of $z$ multiplied by $p$. The integer $x$ can be one or can be as high as the number of isocyanate moieties present in the prepolymer; however, where the catalyst is prepared in situ, as discussed hereinafter, $x$ will generally be 1 or 2 since in said in situ preparation, the alkanolamine is reacted with a large excess of isocyanate-terminated prepolymer.

It is the combination of the urethane linkage and the tertiary amino moiety in the same molecule that provides the room temperature latency combined with accelerated activity at elevated temperature of the present invention catalyst as compared to tertiary amines per se, tertiary amine compounds in combination with urethane co-catalysts, or tertiary amine per se compounds in combination with other materials, e.g. esters or ureas.

The catalyst of this invention can be preformed by reacting stoichiometric amounts of dialkylalkanolamine with an isocyanate-terminated urethane prepolymer. Alternatively, the catalyst of this invention can be formed in situ by adding, for example, 0.1 to 10 weight percent dialkylalkanolamine to the isocyanate-terminated prepolymer to be trimerized or to a mixture of the polyol and polyisocyanate precursors of said prepolymer to be trimerized. Where a polyol-polyisocyanate reaction mixture is used, the polyol-polyisocyanate and dialkylalkanolamine react at room temperature producing a latent catalyst of Formula III and an isocyanate-terminated prepolymer which will trimerize at elevated temperatures forming polyisocyanurate-urethane.

In general, it is preferred to form the catalyst in situ since this requires less processing and the dialkylalkanolamine is chemically bonded into the resulting polyisocyanurate-urethane eliminating any objectionable odor associated with the amine moiety.

When the urethane linkage in the catalyst of this invention is derived from an aromatic isocyanate, i.e. where the nitrogen atom of the urethane linkage in Formula III is bonded to a ring carbon atom of an aromatic nucleus, a catalyst results which has greater activity at elevated temperatures as well as having a desirable latency at room temperature. Catalysts where the urethane linkage is derived from aliphatic isocyanates, e.g. octylisocyanate, have both a room temperature latency and an activity at high temperature intermediate between those of known trialkylamine catalysts and the catalyst of this invention derived from aromatic isocyanates.

The amount of catalyst used in trimerizing the polyisocyanate or polyol-polyisocyanate reaction mixtures in accordance with this invention will vary depending upon the particular catalyst used and the desired activity of the catalyst. Generally, the amount of catalyst used will be less than 10 weight percent, e.g. 0.5 to 5 weight percent, of the isocyanate-terminated prepolymer reactant (or polyol-polyisocyanate mixture) to be trimerized. Functionally stated, the amount of catalyst used will be that amount sufficient to catalyze the polymerization or trimerization of the prepolymer or polyol-polyisocyanate reaction mixture at the desired curing temperature. The desired amount of catalyst is mixed with the isocyanate prepolymer or polyol-polyisocyanate mixture at room temperature thereby forming a latently curable reaction mixture which is heated later when desired to activate the catalyst and effect a rapid cure.

When used in combination with an epoxy compound as co-catalyst, the dialkylaminoalkylurethane catalyst of this combination, while retaining good room temperature latency, provides a faster and more complete cure at elevated temperatures.

The organic epoxy compounds useful as co-catalysts for the practice of this invention are those which typically contain one or more epoxy groups, which have the structure

(IV)

Such compounds, broadly called vicinal epoxides, include epoxy compounds and epoxides of the polymeric type and can be aromatic, aliphatic, cycloaliphatic or heterocyclic and will typically have an epoxy equivalency (i.e. the number of epoxy groups contained in the average molecule) of from preferably 1–3. Such epoxides are well-known and include epihalohydrins, such as epichlorohydrin; alkylene oxides, such as butylene diepoxide or styrene oxide; and glycidyl ethers, such as the diglycidyl ether of a polypropylene oxide diol or an epoxy-novolac resin. A list of commercially available epoxy compounds suitable for use in this invention can be found in Encyclopedia of Polymer Science and Technology, vol. 6, page 218, Interscience Pub., New York (1967). In general, it is preferable to use an epoxy co-catalyst with a high boiling point to prevent loss by evaporation during the curing reaction. The amount of the epoxy compound used will vary with the type of epoxy chosen, the polyisocyanate being trimerized, and the rate of cure desired; generally amounts of epoxy co-catalyst in the range of 0.001 percent to 5 percent by weight, preferably 0.005 to 2 percent by weight, of the isocyanate-terminated prepolymer (or polyol-polyisocyanate mixture) to be trimerized are sufficient to impart improved cure rates.

The NCO-terminated prepolymers trimerized with the catalyst of this invention to produce urethane-modified polyisocyanurates are known (e.g. see U.S. Pat. No. 3,054,-755) and are generally prepared by reacting an excess of polyisocyanate, such as an aromatic diisocyanate, with polyoxyalkylene polyols, or polyester polyols as hereinbefore described. The prepolymers to be trimerized preferably have the same structure as that shown in Formula I above.

The polyol used to form the isocyanate-terminated prepolymers to be trimerized is preferably a low molecular weight polyoxyalkylene polyol, but may also be a low molecular weight non-polymeric polyol, or a polyester or polyether amide containing reactive hydroxyl groups. Polyols having a molecular weight up to about 5000 are useful. A polyol of hydroxyl equivalent weight between about 130 and 1000 (i.e., one active OH group per 130 to 1000 molecular weight of polyol) is preferred. Polyols useful in preparing the prepolymers to be trimerized include those discussed hereinbefore in the preparation of the catalyst of this invention. Where softer polyisocyanurate reaction products are desired, the polyol may have one reactive OH group per 400 to 1000 atomic weight units of polymer. The rubbery polyisocyanurate products preferably should have a cross-linked density of about one isocyanurate cross-link per 2000 to 20,000 atomic weight units, while the more rigid products have a cross-link density of about one cross-link per 400–2000 atomic weight units.

Generally, the polyol-polyisocyanate reaction mixtures cured with the catalyst of this invention can have NCO/OH equivalent ratios in the range of 1/1 to 12/1, and even higher, e.g. 20/1, preferably at least 1.2/1 since below the latter, the polyisocyanurate product will contain unreacted or free hydroxyl groups (which have a plasticizing function) and will be a more flexible product. Products made from reaction mixtures having NCO/OH ratios of 1/1 to 1.2/1 can be characterized as isocyanurate-modified polyurethanes, the isocyanurate content generally being at least 1.0 weight percent of the product. Those products made from reaction mixtures with NCO/OH ratios of 1.2/1 and greater, e.g. 3/1–12/1, can be characterized as urethane-modified polyisocyanurates, the isocyanurate content being generally at least 5.0 weight percent of the product. The preferred products are those which are highly cross-linked by reason of having 20–80 percent of the NCO groups of the polyisocyanate reactant converted into isocyanurate linkages. In general, regardless of the NCO/OH ratio, the mixed polyisocyanurate-polyurethane products of this invention have an amount of isocyanurate linkage in the polymer backbone sufficient to provide a heat stable product, i.e., a product which retains 75–100 percent of its room temperature hardness when heated at elevated temperatures, e.g. one hour at 300–500° F.

Where a higher cross-linked or chain-extended product is desired, the isocyanate-terminated prepolymer can be formed from a polyol-polyisocyanate reaction mixture which includes a conventional trifunctional or polyfunctional isocyanate or a triol. The reaction mixture can also include modifying mono-isocyanates or alcohols, such as 1,4-butanediol, butyl-Cellosolve, butylcarbitol, etc., to impart special properties to the polymer product, such as the degree of hardness.

Curing of the isocyanate-terminated prepolymers in the presence of the catalyst of this invention is generally carried out at an elevated temperature, generally in the range of 40–175° C., preferably within the range of 90–150° C., and usually takes place in 100 minutes or less at these temperatures. The rate of curing will be influenced by the dialkylalkanolamine precursor chosen in making the dialkylaminoalkylurethane catalyst as well as the polyisocyanate and the curing temperature and catalyst concentration. This is in contrast to previously known catalysts which do not provide accelerated curing rates at elevated temperatures combined with catalyst latency at room temperature.

Objects and advantages of this invention are illustrated in the following examples, but the various materials and amounts described in these examples, and various other conditions and details recited therein should not be construed to limit the scope of this invention. All parts are by weight unless otherwise specified.

EXAMPLE I

A liquid isocyanate-terminated urethane prepolymer was prepared by stirring for a period of 24 hours a mixture comprising 210 grams of polymethylene polyphenyl isocyanate ("Mondur MRS," having an equivalent weight of 135) and 70 grams of polypropylene oxide diol having an equivalent weight of 1000. Infrared analysis indicated all of the hydroxyl groups had reacted with polyisocyanate to form urethane linkages. In a plurality of runs, duplicate samples of the resulting isocyanate-terminated prepolymer were mixed with various tertiary amines by blending 1–5 percent by weight of the amines. The latency (i.e. cure time at room temperature) of one set of samples was observed and recorded. The other set of duplicate samples were heated in a warm air oven at about 135° C. and periodic observations made, until the polyisocyanurate resin was firm and nontacky. The runs and results are summarized in Table I.

TABLE I

| Run No. | Tertiary amine added to polyisocyanate | Cure time at room temperature | Cure time at 135° C. | Shore D hardness of polyisocyanurate |
|---|---|---|---|---|
| 1 | $(CH_3)_2NCH_2CH_2OH$ | 49–56 days | 21–27 min | 87. |
| 2 | $(CH_3)_2NCH_2CH_2CH_2OH$ | 30–31 days | 42–48 min | 88. |
| 3 | $(CH_3)_2NCH_2\overset{OH}{\underset{|}{C}}HCH_3$ | 80–90 days | 24–30 min | 87. |
| 4 | $(C_2H_5)_2NCH_2CH_2OH$ | 52–58 days | 12–24 min | 75. |
| 5 | $(C_4H_9)_2NCH_2CH_2OH$ | 51–58 days | 25–30 min | 80. |
| 6 | $(C_2H_5)_2NCH_2CH_2CH_2OH$ | 30–35 days | 15–35 min | 82. |
| 7 | $C_8H_{17}\overset{H}{N}\overset{O}{\overset{\|}{C}}OCH_2CH_2N(CH_3)_2$ | 90–100 days | 78–96 min | 85. |
| 8 | $(CH_3)_2N(CH_2)_6OH$ | 7–10 days | 120–150 min | 20. |
| 9 | $(CH_3)_2NCH_2\overset{OH}{\underset{|}{C}}HCH_2OH$ | 87–96 days | >2 hrs | Bubbled. |
| 10 | $CH_3N(CH_2CH_2OH)_2$ | 90–100 days | 40–50 min | Do. |
| 11 | $N(CH_2CH_2OH)_3$ | 90–100 days | 60–95 min | 45. |
| 12 | (para-OH phenyl with three R groups, where R is $CH_2N(CH_3)_2$) | 7–22 hrs | >7 hrs | Too soft to measure. |
| 13 | Dimethylbenzylamine | 60 days | >7 hrs | 15. |
| 14 | Dimethyldodecylamine | 21–24 days | >6 hrs | 15. |
| 15 | Dimethylcyclohexylamine | 5–6 days | >7 hrs | 12. |
| 16 | $(CH_3)_2NCH_2CH_2N(CH_3)_2$ | 15–18 days | >7 hrs | Too soft to measure. |
| 17 | $(CH_3)_2NCH_2CH_2CN$ | 50 days | >7 hrs | Do. |
| 18 | phenyl–$\overset{O}{\overset{\|}{C}}NHCH_2CH_2N(CH_3)_2$ | 31–36 days | >2 hrs | 60. |
|  |  | 31–36 days | >2 hrs | 60. |

TABLE I—Continued

| Run No. | Tertiary amine added to polyisocyanate | Cure time at room temperature | Cure time at 135° C. | Shore D hardness of polyisocyanurate |
|---|---|---|---|---|
| 19 | 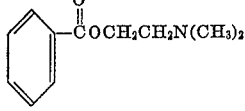 C₆H₅—COCH₂CH₂N(CH₃)₂ | 100–110 days | >8 hrs | 10. |
| 20 | CH₃COCH₂CH₂N(CH₃)₂ | 90–100 days | >8 hrs | 10. |
| 21 | (CH₃)₂NCH₂CH₂NH₂ | 12–15 days | >3 hrs | Too soft to measure. |
| 22 | Dimethylcyclohexylamine plus C₄H₉OH | 2–3 days | 105–195 min | 50. |

Runs 1–10 show the results obtained using various hydroxy tertiary amines to form various urethanes in situ, with Runs 1–6 being the dialkylalkanolamine precursors used in making the catalyst of this invention. The catalyst of Runs 1–6 is shown to have a room temperature latency of at least 30 days, coupled with accelerated cure rates at 135° C. of less than 60 minutes, and thus are demonstratably better than the catalyst used in the other runs. Runs 11–17 show the effectiveness of known amines having utility for trimerizing isocyanate, while Runs 18–21 show the effects of using a tertiary amine compound lacking a urethane moiety in the same molecule. Run 22 is similar to those mixtures disclosed in U.S. Pat. 2,954,365.

The cross-linking of the cured polyisocyanurate resins in Runs 1–6 is noticeably higher than that of the other amines as shown by Shore D hardness of greater than 70. The low level of cross-linking of Runs 8–22 is indicated by the Shore D hardness of 60 or less measured on the cured samples. Such a low level of cross-linking makes products formed using these catalyst less desirable where a hard, tough, cross-linked material is desired.

The poly(isocyanurate-urethane) resins formed using the dialkylaminoalkyl-urethane catalysts of this invention demonstrate their utility in obtaining fast cure rate and high level of cross-linking at elevated temperature while having good room temperature latency.

EXAMPLE II

By a procedure similar to that described in Example I, 8.1 grams of "Mondur MRS" polyisocyanate was reacted with 1.8 grams N,N-dimethylethanolamine to provide a catalyst falling within the scope of Formula I where R″ is the polymethylene polyphenyl residue of the polyisocyanate. The catalyst was used to trimerize the isocyanate-terminated prepolymer of Example I. The resulting mixture, having a room temperature latency of 45–51 days, cured in 27–30 minutes at 135° C. to a poly (urethane-isocyanurate) with a Shore D hardness of 87.

EXAMPLE III

Two reaction mixtures were formed with the following compositions:

Mixture A: Parts
Isocyanate-terminated prepolymer [1] _____ 100
HOCH₂CH₂N(CH₃)₂ _____ 1
Polypropylene oxide diglycidyl ether [2] _____ 1
Mixture B:
Isocyanate-terminated prepolymer [1] _____ 100
N,N-dimethylcyclohexylamine _____ 1
Polypropylene oxide diglycidyl ether [2] _____ 1

[1] Prepolymer used was that described in Example I.
[2] "DER 736" having an equivalent weight of 175–205.

After mixing, each formulation was allowed to stand at ambient room temperature of about 25° C. After 20 hours, the bulk viscosities of the mixtures were measured by means of a Brookfield viscometer with the following results:

Mixture: Viscosity, centipoises
A _____ 13,900
B _____ 58,300

Formulation B was solid when examined after standing at ambient temperature 24 hours while Formulation A was still fluid when examined 3 days later. This demonstrates even with a co-catalyst, such as epoxy, the tertiary amino urethane systems of this invention retain room temperature latency for several days.

EXAMPLE IV

"Adiprene" L–167, a polytetramethylene oxide diol end-capped with tolylene diisocyanate, having 6–7 weight percent NCO, was mixed with 2 weight percent N,N-dimethylethanolamine and the mixture was heated to about 135° C. for about 15 minutes. The isocyanate-terminated polymer cured to a flexible poly(urethane-isocyanurate) rubber having a Shore A hardness of 50. A portion of the reaction mixture kept at room temperature, about 25° C., remained fluid for 51–54 days.

A similar mixture employing N,N-dimethylcyclohexylamine as the catalyst required about 2 hours at 135° C. to cure completely; the resulting poly(urethane-isocyanurate) had a Shore A hardness of 45. A portion of this reaction mixture kept at room temperature solidified in 5–6 days.

EXAMPLE V

An isocyanate-terminated prepolymer was prepared by stirring 66 parts tolylene diisocyanate, 18 parts of polypropylene oxide diol having an equivalent weight of 1000, and 16 parts tripropylene glycol. A sample of the isocyanate-terminated polymer was blended with 2 weight percent N,N-dimethylethanolamine and cured at 95° C. in 30–35 minutes giving a cured poly(urethane-isocyanurate) resin having a Shore D hardness of 91. A portion of the reaction mixture remained fluid at ambient room temperature for more than 7 days.

The same isocyanate-terminated polymer mixed with N,N-dimethylcyclohexylamine required 50–56 minutes to cure at 95° C. The resulting resin was quite brittle and had a Shore D hardness of 50. A portion of the reaction mixture solidified in about 24 hours at ambient room temperature.

EXAMPLE VI

A mixture comprising 70 parts polymethylene polyphenyl isocyanate having an equivalent weight of 135, 30 parts polypropylene oxide diol having an equivalent weight of 1000, and 2 parts N,N-dimethylethanolamine was stirred for 5 minutes at room temperature. During the stirring, the mixture became slightly warm. Infrared analysis indicated essentially all of the hydroxyl groups had reacted to form urethane linkages. A portion of the mixture was heated at about 135° C. for 30 minutes. A bubble-free poly(urethane-isocyanurate) having a Shore D hardness of 86 was obtained after curing. A portion of the reaction mixture kept at ambient room temperature remained fluid for more than 40 days.

A similar polyisocyanate-polyol mixture was catalyzed using N,N-dimethylcyclohexylamine in place of N,N-dimethylethanolamine. Urethane linkages also formed within a few minutes; however, the second mixture required several hours to cure at 135° C. while the room temperature latency was only 1–2 days.

EXAMPLE VII

The isocyanate-terminated prepolymer described in Example I was cured at 135° C. using various amines added to the prepolymer as catalysts or reacted in situ to form the dialkylaminoalkylurethane of this invention. Vinylcyclohexene dioxide was used as an epoxy co-catalyst. In Run 1, the N,N-dimethylethanolamine was used at one percent by weight of the isocyanate prepolymer. The other runs used an amount of catalyst equivalent to the amine equivalent used in Run 1. The vinylcyclohexene dioxide was used at a level of 0.1 percent by weight of the isocyanate prepolymer. The results are tabulated in Table II:

TABLE II

| Run | Cure time at room temperature | Amine used with vinyl-cyclohexene dioxide | Cure time at 275° F. | Shore D hardness |
|---|---|---|---|---|
| 1 | 27–30 days | N,N-dimethylaminoethanol | 20 min | 88 |
| 2 | 8–9 days | N,N-dimethylcyclohexylamine | 4 hrs | 52 |
| 3 | 18–21 days | N,N-dimethylbenzylamine | 3.5 hrs | 35 |
| 4 | 11–14 days | N,N-dimethyldodecylamine | 5 hrs | 60 |

The dialkylaminoalkylurethane catalyst formed by Run 1 displays better room temperature latency, combined with a faster cure and a greater degree of cross-linking even when an epoxy-containing compound is present.

EXAMPLE VIII

The isocyanate-terminated polymer of Example V was blended with one percent by weight N,N-dimethylethanolamine and 0.05 percent by weight polypropylene oxide diglycidylether having an equivalent weight of 175–205. Heating the resulting mixture at 105° C. cured the isocyanate-terminated polymer in 21–24 minutes to a poly-(urethane-isocyanurate) with a Shore D hardness of 88. At room temperature, the reaction mixture remained fluid for more than 24 hours. In similar runs, substituting N,N-dimethylcyclohexylamine for N,N-dimethylethanolamine, curing at 105° C. required 50–55 minutes and the Shore D hardness of the resulting resin was only 70. At room temperature, the reaction mixture remained fluid for only 6 hours.

Various modifications and alterations of this invention will become apparent to those skilled in the art without departing from the scope or spirit of this invention, and it should be understood that this invention is not to be limited to the illustrative embodiments set forth herein.

What is claimed is:
1. A method for trimerizing isocyanate-terminated urethane prepolymer to form poly(isocyanurate-urethane) comprising heating said prepolymer in the presence of a dialkylaminoalkylurethane catalyst having the structure:

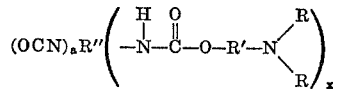

where R″ is the isocyanate-free residue of an isocyanate-terminated prepolymer, R′ is lower alkylene having 2–5 carbon atoms, R is lower alkyl having 1–6 carbon atoms, $x$ is an integer of at least one, and $a$ is zero or an integer of at least one.

2. The method according to claim 1 wherein an epoxy co-catalyst is also present.

3. The method according to claim 1 where R is lower alkyl having 1–3 carbon atoms and R′ is lower alkylene having 2–3 carbon atoms.

4. The method according to claim 1 where R is methyl and R′ is ethylene.

5. The method according to claim 1 wherein the urethane moiety shown in the structural formula is bonded to a ring carbon atom of an aromatic nucleus such as a benzene nucleus.

6. The method according to claim 1, wherein said prepolymer is the reaction product of a polyoxyalkylene polyol and an excess of an aromatic polyisocyanate.

7. A latently curable mixture comprising isocyanate-terminated urethane prepolymer and dialkylaminoalkylurethane having the structure:

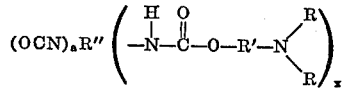

where R″ is the isocyanate-free residue of an isocyanate-terminated prepolymer, R′ is lower alkylene having 2–5 carbon atoms, R is lower alkyl having 1–6 carbon atoms, $x$ is an integer of at least one, and $a$ is zero or an integer of at least one.

8. The curable mixture of claim 7 wherein said prepolymer is the reaction product of a polyoxyalkylene polyol and an excess of an aromatic polyisocyanate, R is methyl, R′ is ethylene, and the urethane moiety shown in the structural formula is bonded to a ring carbon atom of an aromatic nucleus.

References Cited
UNITED STATES PATENTS

| | | | |
|---|---|---|---|
| 2,954,365 | 9/1960 | Windemuth et al. | 260—248 NS |
| 2,979,485 | 4/1961 | Burkus | 260—248 NS |
| 3,476,710 | 11/1969 | Altscher et al. | 260—77.5 NC |

MAURICE J. WELSH, Jr., Primary Examiner

U.S. Cl. X.R.

260—248 NS